US012639022B2

(12) United States Patent
Watanabe

(10) Patent No.: US 12,639,022 B2
(45) Date of Patent: May 26, 2026

(54) DISPLAY DEVICE MANAGEMENT METHOD AND MANAGEMENT SYSTEM

(71) Applicant: SEIKO EPSON CORPORATION, Tokyo (JP)

(72) Inventor: Sayaka Watanabe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/041,271

(22) Filed: Jan. 30, 2025

(65) Prior Publication Data

US 2025/0251888 A1    Aug. 7, 2025

(30)    Foreign Application Priority Data

Feb. 2, 2024    (JP) ................................. 2024-014725

(51) Int. Cl.
*G09G 5/00*        (2006.01)
*G06F 3/14*        (2006.01)
(52) U.S. Cl.
CPC ...................................... G06F 3/14 (2013.01)
(58) Field of Classification Search
CPC .......... G06F 3/14; G09F 9/30; G03B 21/2053
USPC ............................................................. 345/3
See application file for complete search history.

(56) References Cited

U.S. PATENT DOCUMENTS

2010/0014007 A1    1/2010    Kotani
2012/0236270 A1    9/2012    Maruyama

2012/0236271 A1    9/2012    Maruyama
2014/0160446 A1*   6/2014    Kumamoto .......... H04N 9/3179
                                                              353/121
2018/0288208 A1*  10/2018    Lee ................. H04M 1/724092
2019/0130868 A1    5/2019    Kasahara et al.
2024/0378004 A1*  11/2024    Krishnan .................. G06F 3/14

FOREIGN PATENT DOCUMENTS

JP        2006-023551 A        1/2006
JP        2009-288570 A        12/2009
JP        2010-243845 A        10/2010
JP        2012-015832 A        1/2012
JP        2012-194225 A        10/2012

(Continued)

*Primary Examiner* — Jennifer T Nguyen
(74) *Attorney, Agent, or Firm* — Dority & Manning, P.A.

(57)                ABSTRACT

A display device management method includes: causing a display device to acquire type information indicating a type of an input signal input; causing the display device to transmit device identification information for identifying the display device and the type information to an information processing device; causing the information processing device to calculate information indicating a status of use of the input signal of each type indicated by the type information for each of the device identification information; causing the information processing device to acquire, from a storage unit, organization identification information associated with the device identification information, the organization identification information being identification information of an organization to which a user using the display device of the device identification information or the display device belongs; and outputting the organization identification information and the information indicating the status of use of the input signal.

11 Claims, 11 Drawing Sheets

(56)           References Cited

FOREIGN PATENT DOCUMENTS

| | | | | |
|---|---|---|---|---|
| JP | 2012-194226 A | 10/2012 | | |
| JP | 2015-121648 A | 7/2015 | | |
| JP | 2015121648 | * | 7/2015 | .............. G09G 3/20 |
| JP | 2019-080280 A | 5/2019 | | |

* cited by examiner

| ORGANI-ZATION ID | PROJECTOR ID | MODEL INFORMATION |
|---|---|---|
| | 123··· | ABC··· |
| | 456··· | DEF··· |
| | 789··· | GHI··· |
| ··· | ··· | ··· |

| PROJECTOR ID | TIME OF USE OF DEVICE LIGHT SOURCE | SIGNAL TYPE | TIME OF USE OF LIGHT SOURCE BY SIGNAL TYPE | FIRST RATE OF USE |
|---|---|---|---|---|
| ○ × ▲ | 72 HOURS | HDMI | × × HOURS | ○ × % |
|  |  | DISPLAY PORT | □ □ HOURS | △ □ % |
|  |  | WI-FI SIGNAL | □ ○ HOURS | ▨ □ % |
| ... | ... | ... | ... | ... |

*FIG. 6*

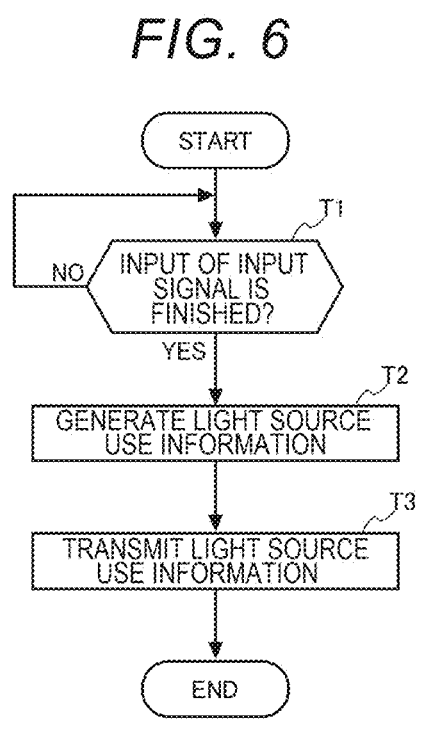

```
              ┌─────────┐
              │  START  │
              └────┬────┘
                   │
     ┌─────────────┤
     │             ▼              T1
     │    ╱──────────────────╲
  NO │   ╱   INPUT OF INPUT    ╲
     └──┤      SIGNAL IS        │
         ╲     FINISHED?       ╱
          ╲──────────────────╱
                   │
                  YES
                   │              T2
                   ▼
        ┌────────────────────────┐
        │ GENERATE LIGHT SOURCE   │
        │    USE INFORMATION      │
        └───────────┬────────────┘
                    │             T3
                    ▼
        ┌────────────────────────┐
        │ TRANSMIT LIGHT SOURCE   │
        │    USE INFORMATION      │
        └───────────┬────────────┘
                    │
                    ▼
              ┌─────────┐
              │   END   │
              └─────────┘
```

| PROJECTOR ID | NUMBER OF TIMES OF DEVICE INPUT | SIGNAL TYPE | NUMBER OF TIMES OF INPUT OF SIGNAL TYPE | FIRST RATE OF USE |
|---|---|---|---|---|
| ○ × ▲ | 113 | HDMI | 15 | ○ × % |
| | | DISPLAY PORT | 23 | ○ △ % |
| | | WI-FI SIGNAL | 52 | □ × % |
| | | ... | ... | ... |
| ... | ... | | | |

DISPLAY DEVICE MANAGEMENT METHOD AND MANAGEMENT SYSTEM

The present application is based on, and claims priority from JP Application Serial Number 2024-014725, filed Feb. 2, 2024, the disclosure of which is hereby incorporated by reference herein in its entirety.

BACKGROUND

1. Technical Field

The present disclosure relates to a display device management method and a management system.

2. Related Art

According to the related art, a technique of remotely managing a device used by a user is known. For example, JP-A-2012-15832 discloses a management system that manages the operation state of a projector. A management system described in JP-A-2012-15832 acquires information related to the operation status of a projector and manages the operation status of the projector.

JP-A-2012-15832 is an example of the related art.

Recently, as display devices are in widespread use in the field of education and among general consumers, there is a demand for detailed management of the display devices. For example, it is conceivable to manage the status of use for each type of input signal input to the display device, but the input signal input to the display device needs to be managed for each type in order to perform such management. However, in the related art, there is no measure for acquiring information about the status of use for each type of input signal.

SUMMARY

According to an aspect of the present disclosure, a display device management method includes: causing a display device to acquire type information indicating a type of an input signal input to the display device; causing the display device transmit to device identification information for identifying the display device and the type information to an information processing device; causing the information processing device to store the device identification information and the type information in a storage unit in association with each other; causing the information processing device to calculate information indicating a status of use of the input signal of each type indicated by the type information for each of the device identification information; causing the information processing device to acquire, from the storage unit, organization identification information associated with the device identification information, the organization identification information being identification information of an organization to which a user using the display device of the device identification information or the display device belongs; and outputting the organization identification information and the information indicating the status of use of the input signal.

According to another aspect of the present disclosure, a management system includes a display device and an information processing device, the display device including: a first communication unit; an interface; and a first control unit that acquires type information indicating a type of an input signal input to the interface and causes the first communication unit to transmit the acquired type information and device identification information for identifying the display device to the information processing device, the information processing device including: a second communication unit; and a second control unit that stores the device identification information and the type information received by the second communication unit in a storage unit in association with each other, calculates information indicating a status of use of the input signal of each type indicated by the type information for each of the device identification information, acquires, from the storage unit, organization identification information associated with the device identification information, the organization identification information being identification information of an organization to which a user using the display device of the device identification information or the display device belongs, and outputs the organization identification information and the information indicating the status of use of the input signal.

BRIEF DESCRIPTION OF THE DRAWINGS

FIG. 4 illustrates an example of a configuration of a user management database.

FIG. 5 illustrates an example of a configuration of a first status-of-use management database.

FIG. 6 is a flowchart showing an example of operation of the projector.

FIG. 9 illustrates an example of a configuration of a second status-of-use management database.

DESCRIPTION OF EMBODIMENTS

An embodiment of the present disclosure will now be described with reference to the drawings.

1. System Configuration of Management System

Figure 1:
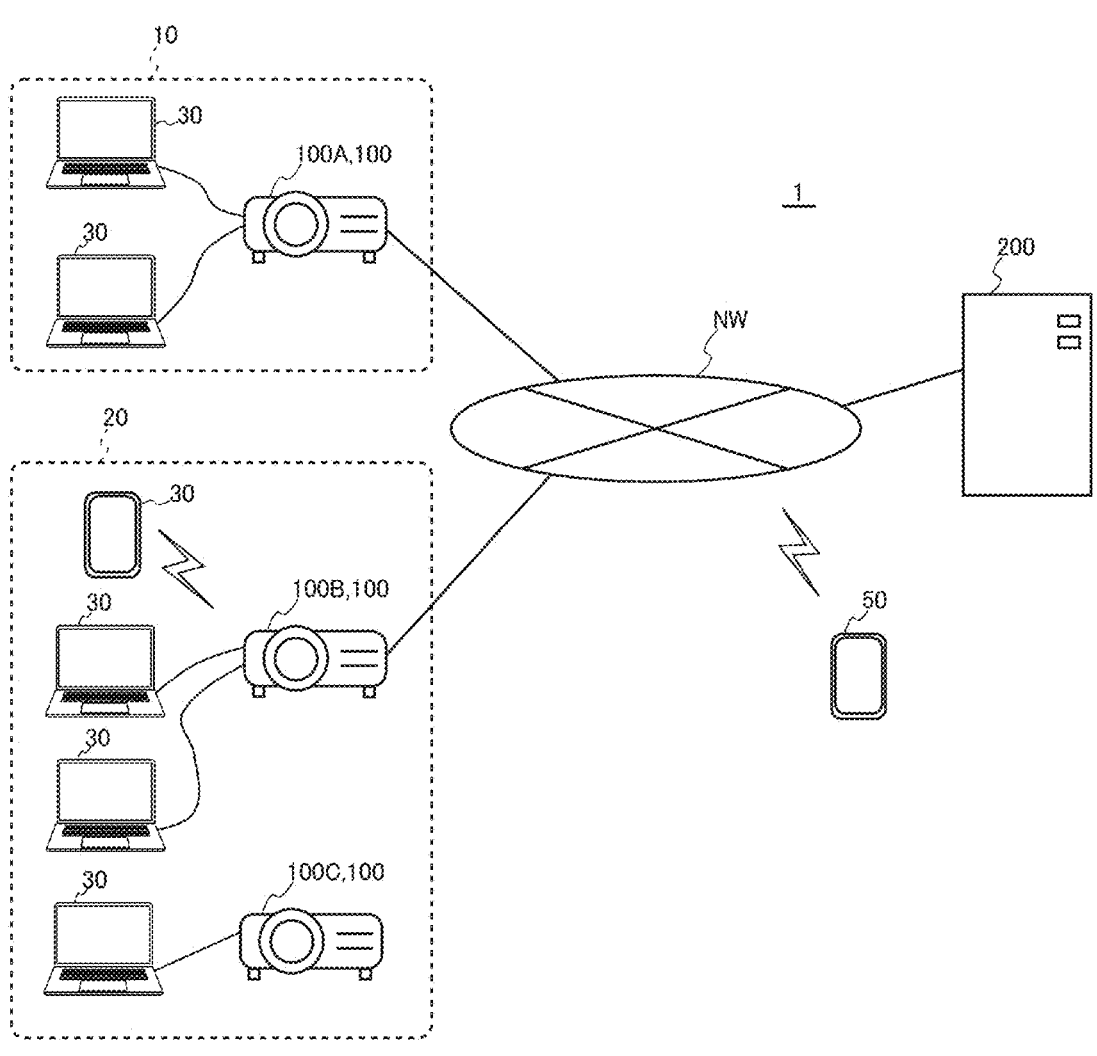
FIG. 1 illustrates a configuration of an information processing system.

FIG. 1 illustrates the system configuration of a management system 1.

The management system 1 includes a projector 100, which is an example of a display device, and an information processing device 200. The projector 100 and the information processing device 200 are communicably connected via a communication network NW.

FIG. 1 illustrates projectors 100A, 100B, and 100C as the projectors 100 connected to the information processing device 200 via the communication network NW, but any number of projectors 100 may be connected to the information processing device 200.

A terminal device 30, which is an image supply device serving as a supply source of image data, can be coupled to each projector 100. The terminal device 30 is a smartphone, a tablet personal computer (PC), a laptop PC, or another computer. The connection form between the terminal device 30 and the projector 100 may be wired connection or wireless connection.

The projector 100 projects image light onto a projection surface and thus displays an image on the projection surface. The projection surface may be a curtain-like screen or may be a wall surface of a building or a surface of an installed object.

The relationship between the installation positions of the projector 100 and the terminal device 30, the owner thereof, and the installation position of the information processing device 200 is not limited. For example, in the example shown in FIG. 1, the projector 100A belongs to a first organization 10 and is installed at a place related to the first organization 10. The projectors 100B and 100C belong to a second organization 20 and are installed at locations related to the second organization 20. The organizations 10 and 20 are, for example, a school, a company, a store, or another organization. The projector 100 may be a device belonging to an individual.

The communication network NW may be a local area network (LAN) or a global network including a dedicated line, a public switched network, the internet, or the like. In the present embodiment, example in which the communication network NW is configured with a LAN is described. The communication network NW may be a wireless communication network such as Wi-Fi. Wi-Fi is a registered trademark.

An output terminal 50 can be connected to the information processing device 200 via the communication network NW. The output terminal 50 requests the information processing device 200 to output information. The information processing device 200 outputs information requested by the output terminal 50 to the output terminal 50. The output terminal 50 may be a laptop PC, a desktop PC, a tablet PC, or a smartphone.

2. Configuration of Projector

Figure 2:
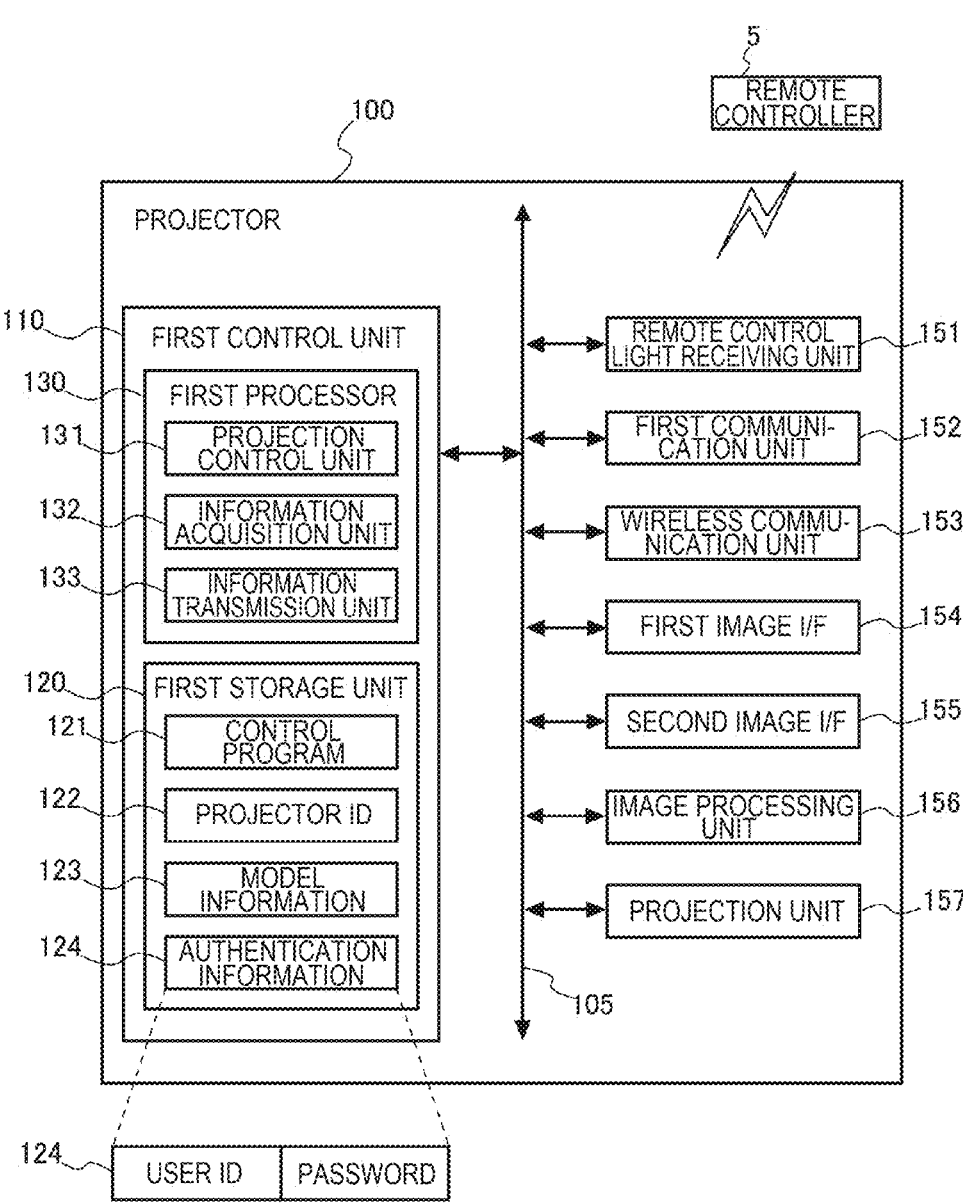
FIG. 2 is a block diagram illustrating a configuration of a projector.

FIG. 2 is a block diagram illustrating the configuration of the projector 100. The basic configurations of the projectors 100 provided in the management system 1 are the same.

The projector 100 includes a first control unit 110. The first control unit 110 includes a first processor 130 configured with a central processing unit (CPU), a micro-processing unit (MPU) or the like, and a first storage unit 120. The first control unit 110 causes the first processor 130 to execute a program and thus controls each unit of the projector 100.

The first storage unit 120 is a nonvolatile storage device including a semiconductor memory element such as a flash memory. The first storage unit 120 stores a control program 121 executed by the first processor 130, data processed by the first processor 130, and the like. The first storage unit 120 has a volatile storage area, which may form a work area for temporarily storing a program to be executed by the first processor 130 and data to be processed.

The first storage unit 120 stores, for example, the control program 121, a projector ID 122, model information 123, and authentication information 124. The control program 121 is a program executed by the first processor 130.

The first processor 130 reads and executes the control program 121 stored in the first storage unit 120 and thus executes various processing by a cooperation between hardware and software. For example, the first processor 130 includes a projection control unit 131, an information acquisition unit 132, and an information transmission unit 133.

These functional units are implemented by the first processor 130 executing the control program 121.

The projector ID 122 is identification information unique to the projector 100. For example, the projectors 100A, 100B, and 100C shown in FIG. 1 have different projector IDs 122 from each other. The projector ID 122 is equivalent to a serial number.

The model information 123 is information indicating the model name of the projector 100. When the projectors 100A, 100B, and 100C shown in FIG. 1 are different models, the projectors 100A, 100B, and 100C have different model information 123. Also, for example, when the projector 100A and the projector 100B are the same model, the projector 100A and the projector 100B have the same model information 123.

The authentication information 124 is information for authenticating a user who uses the projector 100. The authentication information 124 includes, for example, a user ID and a password.

The projector 100 includes a remote control light receiving unit 151, a first communication unit 152, a wireless communication unit 153, a first image interface (I/F) 154, a second image I/F 155, an image processing unit 156, and a projection unit 157. These units are coupled to the first control unit 110 via a bus 105. The first communication unit 152, the wireless communication unit 153, the first image I/F 154, and the second image I/F 155 are equivalent to interfaces provided in the projector 100.

The remote control light receiving unit 151 receives a radio signal transmitted by a remote controller 5. The remote control light receiving unit 151 decodes the received signal, thus generates an operation signal, and outputs the operation signal to the first control unit 110. The radio signal received by the remote control light receiving unit 151 may be, for example, an infrared ray signal, but may be another signal.

The first communication unit 152 is a communication device that is connected to the communication network NW and communicates with the information processing device 200 via the communication network NW. The first communication unit 152 includes, for example, a connector for coupling an Ethernet cable, and a communication circuit for transmitting and receiving signals. Ethernet is a registered trademark.

The wireless communication unit 153 includes a wireless communication circuit conforming to a wireless communication standard such as Wi-Fi or Bluetooth, and performs wireless communication with the terminal device 30 or the information processing device 200. Wi-Fi and Bluetooth are registered trademarks.

The first image I/F 154 and the second image I/F 155 are coupled to the terminal device 30 serving as image sources. The first image I/F 154 and the second image I/F 155 include, for example, communication hardware such as a connector and an interface circuit conforming to a predetermined communication standard. Specifically, the first image I/F 154 and the second image I/F 155 are digital interfaces such as High-Definition Multimedia Interface (HDMI), HD BaseT, and Universal Serial Bus (USB). HDMI and HD BaseT are registered trademarks. The first image I/F 154 and the second image I/F 155 may include an analog video terminal such as an RCA terminal, a VGA terminal, an S terminal, or a D terminal, and may be configured to be able to receive analog image signals.

The image processing unit 156, under the control of the first control unit 110, executes image processing on image data included in an input signal received by the projector 100 via the first communication unit 152 and image data included in an input signal input from the terminal device 30 to the projector 100. The image processing performed by the image processing unit 156 includes, for example, resolution conversion processing, resizing processing, geometric correction processing, digital zoom processing, luminance adjustment processing, and projection position correction processing. Also, for example, when a plurality of projectors 100 are arranged side by side to execute tiled projection, the image processing unit 156 executes edge blending processing. The type of image processing executed by the image processing unit 156 is designated by the first control unit 110. Also, parameters and data for calculation used for the image processing by the image processing unit 156 are input from the first control unit 110 to the image processing unit 156. The image processing unit 156 generates a display signal for displaying an image after the image processing, and outputs the display signal to a light modulation device of the projection unit 157. The first control unit 110 sets parameters and calculation data for the image processing performed by the image processing unit 156.

The image processing unit 156 may be configured with, for example, an integrated circuit. This type of integrated circuit includes an LSI, an application-specific integrated circuit (ASIC), a programmable logic device (PLD), a field-programmable gate array (FPGA), a system-on-a-chip (SOC), and the like. Also, an analog circuit may be provided as a part of the configuration of the integrated circuit, and the integrated circuit and the first control unit 110 may be integrated together.

The projection unit 157 includes, for example, a light source, a light modulation device, and a projection optical system. The light source turns on under the control of the first control unit 110 and emits light toward the light modulation device. The light source is not limited to any specific configuration. For example, the light source may be a lamp such as a halogen lamp, a xenon lamp, or an ultra-high-pressure mercury lamp, or a solid-state light source such as an LED or a laser light source. The light modulation device modulates the light emitted from the light source. The light modulation device is not limited to any specific configuration. For example, the light modulation device can be configured with a transmissive liquid crystal panel, a reflective liquid crystal panel, or a digital micro-mirror device. The projection optical system provided in the projection unit 157 includes a lens, a mirror, a prism, and the like for causing the image light modulated by the light modulation device to form an image on the projection surface.

The projection unit 157 may include a light source drive circuit that supplies electric power to the light source, and a drive circuit that causes the light modulation device to execute drawing. The projection unit 157 may include a zoom mechanism and a focus adjustment mechanism that adjusts the focus.

The projection control unit 131 executes overall control of the projector 100 and control related to the projection by the projector 100. The projection control unit 131 accepts an input operation by the user using the remote controller 5. The projection control unit 131 causes the projection unit 157 to project an image in response to the input operation by the user. For example, the projection control unit 131 controls the image processing unit 156 to execute image processing on the image data included in the input signal, and controls the light source and the light modulation device of the projection unit 157 to project the image processed by the image processing unit 156 onto the projection surface.

The information acquisition unit 132 acquires the signal type of the input signal that is the source of the image to be projected by the projector 100.

When the input signal is detected, the first communication unit 152, the wireless communication unit 153, the first image I/F 154, and the second image I/F 155, which are interfaces of the projector 100, notify the first control unit 110 of the detection of the input signal.

When notified of the detection of the input signal, the information acquisition unit 132 determines the signal type of the detected input signal. For example, when the first image I/F 154 is an interface conforming to the HDMI standard, the information acquisition unit 132 determines that an HDMI signal is input to the first image I/F 154, based on the notification from the first image I/F 154.

When the wireless communication unit 153 is an interface conforming to the Wi-Fi standard, the information acquisition unit 132 determines that a Wi-Fi signal is input to the wireless communication unit 153, based on the notification from the wireless communication unit 153. The Wi-Fi signal is a packet signal conforming to the Wi-Fi standard.

Next, when the input signal includes image data to be projected by the projection unit 157, the information acquisition unit 132 acquires a time of use of the light source. In other words, the projector 100 projects an image based on the image data included in the input signal, and acquires the time of use of the light source, which is the time during which the light source is on. For example, the information acquisition unit 132 measures the time during which the light source is on, and thus acquires the time of use of the light source. The time of use of the light source is an accumulated time of use of the light source provided in the projector 100.

The information transmission unit 133 transmits light source use information including the signal type and the time of use of the light source of the input signal acquired by the information acquisition unit 132, the projector ID 122, and the model information 123 to the information processing device 200. When the signal type of the input signal input to the projector 100 is changed, the information transmission unit 133 transmits the light source use information including the signal type and the time of use of the light source of the input signal before the change, the projector ID 122, and the model information 123 to the information processing device 200. Also, the information transmission unit 133 transmits the light source use information to the information processing device 200 at a timing when the projection of the image based on the input signal ends.

In the present embodiment, an example in which the light source use information includes the time of use of the light source as the information indicating the input status of the input signal is described, and the information indicating the input status may include the time when the input of the input signal starts and the time when the input of the input signal ends. The information indicating the input status may include the time when the input of the input signal starts and the duration of the input of the input signal. The time when the input of the input signal starts may be a time point after the lapse of a predetermined time from the start of the input of the input signal. The time when the input of the input signal ends may be a time point from the lapse of a predetermined time from the end of the input of the input signal.

3. Configuration of Information Processing Device

Figure 3:
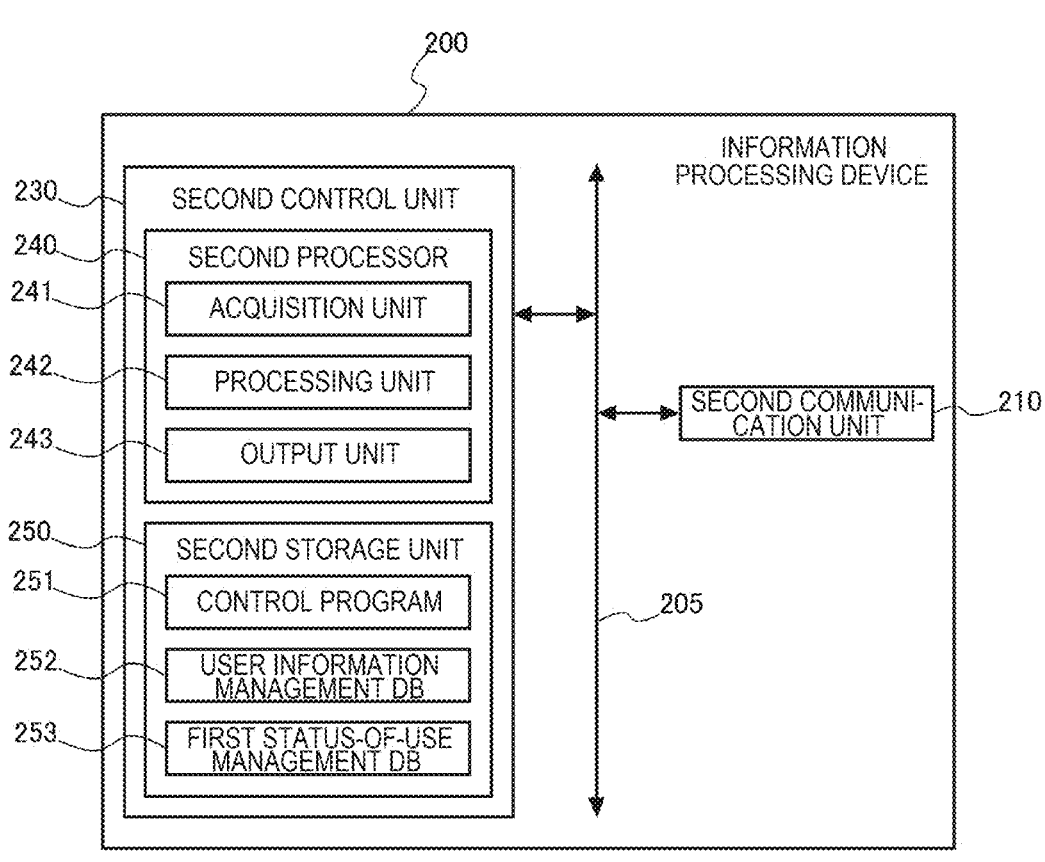
FIG. 3 is a block diagram illustrating a configuration of an information processing device.

FIG. 3 is a block diagram illustrating the configuration of the information processing device 200.

The information processing device 200 is a computer that is communicably connected to the projector 100 and the terminal device 30 via the communication network NW and provides an information processing function. For example, the information processing device 200 may be configured with a single computer, a plurality of computers, or a cloud computer. Hereinafter, the information processing device 200 is described as one server computer, but this is an example.

The information processing device 200 includes a second communication unit 210 and a second control unit 230, and these units are coupled to each other via a bus 205.

The second communication unit 210 is a communication device that is connected to the communication network NW and communicates with the projector 100 and the terminal device 30 via the communication network NW. The second communication unit 210 includes, for example, a connector for coupling an Ethernet cable, and a communication circuit for transmitting and receiving signals.

The second control unit 230 includes a second processor 240 and a second storage unit 250. The second processor 240 is configured with a processor such as a CPU or an MPU.

The second processor 240 reads and executes a control program 251 stored in the second storage unit 250, thus executes various processing by a cooperation between hardware and software, and controls the information processing device 200. For example, the second processor 240 includes an acquisition unit 241, a processing unit 242, and an output unit 243. These functional units are implemented by the second processor 240 executing the control program 251.

The second storage unit 250 is a storage device that stores data in a nonvolatile manner with a flash memory, a magnetic recording medium, an optical recording medium, or the like. The second storage unit 250 stores the control program 251 executed by the second processor 240, data processed by the second processor 240, and the like. The second storage unit 250 stores, for example, a user management database (DB) 252 and a first status-of-uses management DB 253.

FIG. 4 illustrates an example of the configuration of the user management DB 252.

The user management DB 252 is a database in which the projector ID 122 and the model information 123 of the projector 100 owned or managed by an organization of an organization ID are registered in association with the organization ID. The organization ID is identification information for identifying the organization to which the user or the projector 100 belongs. The organization ID may be identification information for identifying the company, the department, or the like that owns the projector 100, or may be identification information for identifying a group set by the user. The organization ID may be identification information for identifying an individual user. The model information 123 is information indicating the model of the projector 100 of the corresponding projector ID 122. The model information 123 is information indicating the model number of the projector 100. The organization ID is equivalent to organization identification information.

FIG. 5 illustrates an example of the configuration of the first status-of-use management DB 253.

The first status-of-use management DB 253 is a database in which a time of use of the device light source, a signal type, a time of use of the light source by signal type, and a first rate of use are registered in association with the projector ID 122.

The time of use of the device light source is information of the time of use of the light source, of the light source provided in the projector 100 corresponding to the projector ID 122. The time of use of the device light source is equivalent to the total time during which the input signal is input to the display device.

The signal type is information indicating an interface provided in the projector 100 of the projector ID 122. In other words, the signal type is information indicating the signal type of the input signal input to the projector 100.

The time of use of the light source by signal type is information indicating the time of use of the light source for each signal type. In other words, the time of use of the light source by signal type is information acquired by calculating the time of use of the light source of the projector 100 for each signal type of the input signal.

In the present embodiment, a case where the time of use of the device light source, which is the time of use of the light source of the light source provided in the projector 100, is calculated is described, but the time of use of the device light source may be the average of the input times of the input signal input during a preset period. Also, the average time for each type of the input signal input during a preset period may be calculated as the time of use of the light source for each signal type.

The first rate of use is information indicating the rate at which the input signal of the signal type is used for projecting an image in the projector 100. The first rate of use is obtained by dividing the time of use of the light source by signal type by the time of use of the device light source.

The acquisition unit 241 acquires the light source use information from the projector 100. The processing unit 242 updates the registration information in the first status-of-use management DB 253, based on the acquired light source use information.

The processing unit 242 detects a record in the first use condition management DB 253 in which the projector ID 122 matches the projector ID 122 included in the light source use information.

The processing unit 242 acquires the time of use of the device light source registered in the detected record. The processing unit 242 subtracts the acquired time of use of the device light source from the time of use of the light source included in the light source use information and thus calculates the time of use of the light source used for the projection of this time.

The processing unit 242 acquires the signal type included in the light source use information and adds the time of use of the light source used for the projection of this time to the time of use of the light source by signal type corresponding to the acquired signal type.

The processing unit 242 also updates the time of use of the device light source with the time of use of the light source included in the light source use information.

The processing unit 242 calculates the first rate of use. The processing unit 242 divides the time of use of the light source by signal type by the time of use of the device light source and thus calculates the first rate of use. The processing unit 242 registers the calculated first rate of use in the corresponding field in the first status-of-use management DB 253.

Moreover, the processing unit 242 calculates the time of use of the light source and the rate of use for each signal type of the projectors 100 belonging to the same organization ID and having the same model information 123. The total of the times of use of the light source of the projectors 100 belonging to the same organization ID and having the same model information 123 is referred to as a total time of use of the light source. The total time of use of the light source is equivalent to the total time calculated for each display device associated with the same organization identification information and having the same model indicated by the model information. The total time of use of the light source may be the average time of the input times of input signals input within a preset period. The rate of use for each signal type of the projectors 100 belonging to the same organization ID and having the same model information 123 is referred to as a second rate of use.

The processing unit 242 acquires the organization ID of the processing target and acquires the model information 123 associated with the acquired organization ID. The processing unit 242 acquires the times of use of the device light source of the projectors 100 having the same model information 123 that is acquired, and calculates the total of these times of use of the light source as the total time of use of the light source.

Moreover, the processing unit 242 calculates the total of the times of use of the light sources by signal type of the projectors 100 having the same model information 123, divides the total of the times of use of the light sources by signal type by the total time of use of the light source, and thus calculates the second rate of use.

The processing unit 242 stores the calculated total time of use of the light source, the total of the times of use of the light sources by signal type of the projectors 100 having the same model information 123, and the second rate of use, in association with the organization ID in the second storage unit 250.

The output unit 243 outputs the information generated by the processing unit 242. The form of output of the information by the output unit 243 may be the transmission of the information to a different device from the information processing device 200, the output by an output device provided in the information processing device 200, and the like. The output device provided in the information processing device 200 may be a display device, or a printing device coupled to the information processing device 200. When the information processing device 200 is a PC or a smartphone and has a display device, the output unit 243 causes the display device to display the information generated by the processing unit 242. In the present embodiment, the output unit 243 transmits the information to the output terminal 50 and thus performs the output.

That is, the output unit 243 in the present embodiment accepts a request for output of information from the output terminal 50, and acquires information indicating the requested status of use from the second storage unit 250. The information indicating the status of use acquired from the second storage unit 250 includes the time of use of the device light source and the time of use of the light source for each signal type, which are information of each projector 100. Also, the information acquired from the second storage unit 250 includes the total time of use of the light source of the same model, the total of the times of use of the light source for each signal type of the projectors 100 of the same model, the second rate of use, and the like, associated with the same organization ID.

The output unit 243 transmits the information acquired from the second storage unit 250 to the output terminal 50. The measure by which the output unit 243 transmits the information to the output terminal 50 is not limited. For example, the output unit 243 may generate data of a web page in which information acquired from the second storage unit 250 is described in the Extensible Markup Language (XML) or the Hypertext Markup Language (HTML), and transmit the generated data to the output terminal 50. For example, the output unit 243 may transmit a message including the information acquired from the second storage unit 250 to the output terminal 50.

FIG. 6 is a flowchart showing an operation of the projector 100. The operation of the projector 100 will be described with reference to the flowchart shown in FIG. 6.

When the projection of an image is started, the first control unit 110 determines whether the input of an input signal that is the source of the image is finished (step T1).

When the input of the input signal is not finished (NO in step T1), the first control unit 110 waits until the input of the input signal is finished.

When the input of the input signal is finished (YES in step T1), the first control unit 110 generates the light source use information (step T2). The light source use information includes the signal type and the time of use of the light source of the input signal, the projector ID 122, and the model information 123. The first control unit 110 transmits the generated light source use information to the information processing device 200 (step T3).

Figure 7:
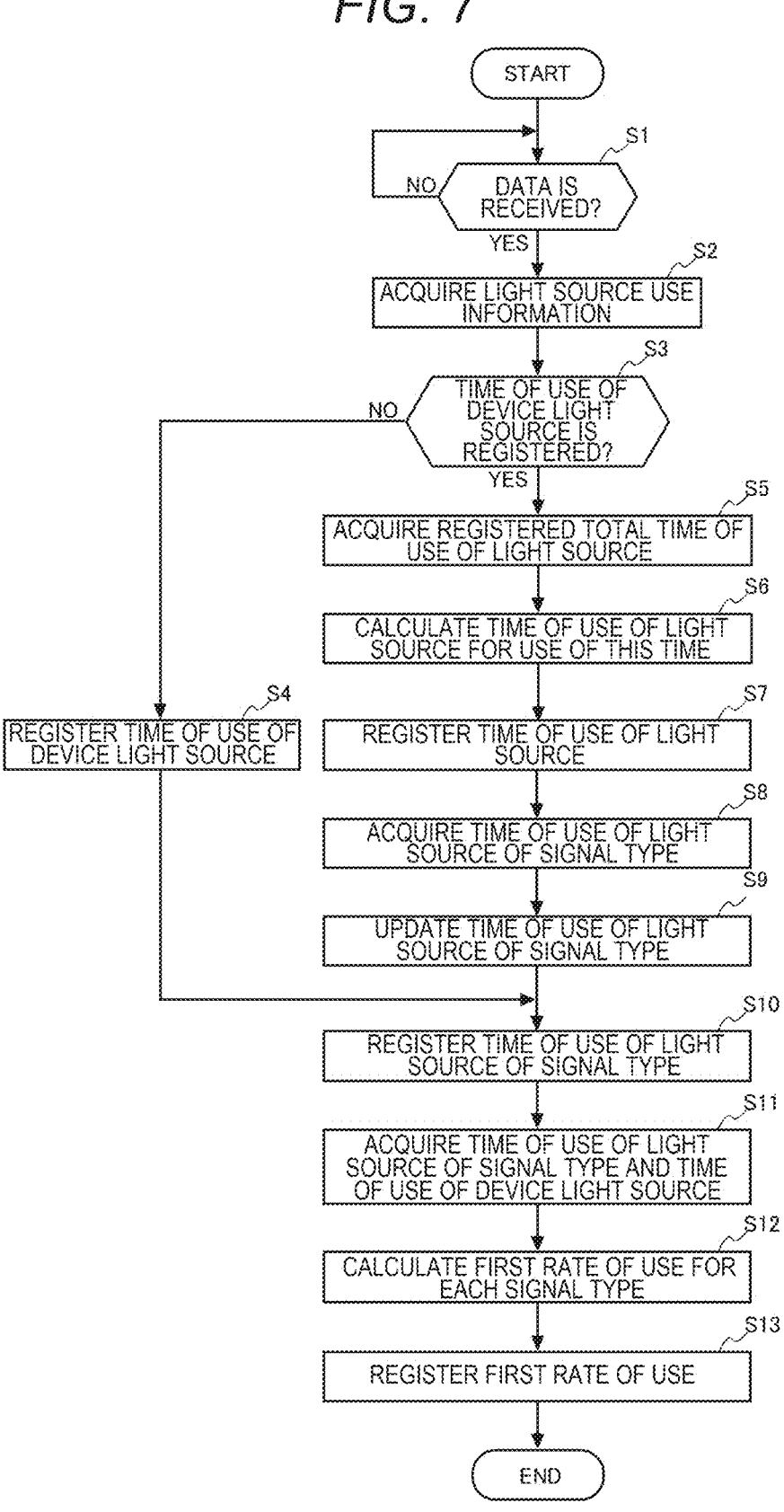
FIG. 7 is a flowchart showing a first example of operation of the information processing device.

FIG. 7 is a flowchart illustrating a first example of operation of the information processing device 200. Specifically, FIG. 7 is a flowchart illustrating an operation when the information processing device 200 calculates the time of use of the device light source and the first rate of use.

The operation of the second control unit 230 will be described with reference to the flowchart shown in FIG. 7.

The second control unit 230 determines whether data is received via the network NW (step S1). When data is not received (NO in step S1), the second control unit 230 waits until data is received.

Upon receiving data (YES in step S1), the second control unit 230 acquires the light source use information included in the received data (step S2).

Next, the second control unit 230 acquires the projector ID 122 included in the acquired light source use information, and determines whether the time of use of the device light source is registered in the record of the corresponding projector ID 122 in the first status-of-use management DB 253 (step S3).

When the time of use of the device light source is not registered in the record of the corresponding projector ID 122 (NO in step S3), the second control unit 230 registers the time of use of the light source included in the light source use information as the time of use of the device light source (step S4). The second control unit 230 registers the time of use of the device light source in the field of the corresponding projector ID 122 of the first status-of-use management DB 253.

Next, the second control unit 230 acquires the projector ID 122 and the signal type included in the light source use information, and registers the time of use of the light source included in the light source use information in the field of the time of use of the light source by signal type corresponding to the projector ID 122 and the signal type that are acquired (step S10).

When the time of use of the device light source is registered in the record of the corresponding projector ID 122 (YES in step S3), the second control unit 230 acquires the registered time of use of the device light source (step S5).

Next, the second control unit 230 subtracts the time of use of the device light source acquired in step S5 from the time of use of the light source included in the light source use information and thus calculates the time of use of the light source for the use of this time (step S6). The second control unit 230 registers the time of use of the light source included in the light source use information as the device light source time (step S7).

Next, the second control unit 230 acquires the time of use of the light source by signal type corresponding to the signal type included in the light source use information (step S8). The second control unit 230 adds the time of use of the light source for the use of this time calculated in step S6 to the time of use of the light source by signal type corresponding to the signal type included in the light source use information and thus updates the time of use of the light source by signal type (step S9). The second control unit 230 registers the updated time of use of the light source by signal type in the corresponding field in the first status-of-use management DB 253 (step S10).

Next, the second control unit 230 acquires the time of use of the device light source of the projector 100 and the time of use of the light source by signal type (step S11). The second control unit 230 calculates the first rate of use, which is the rate of use for each signal type of the input signal, based on the time of use of the device light source and the time of use of the light source by signal type that are acquired (step S12). The second control unit 230 registers the first rate of use calculated for each signal type in the corresponding field in the first status-of-use management DB 253 (step S13).

Figure 8:
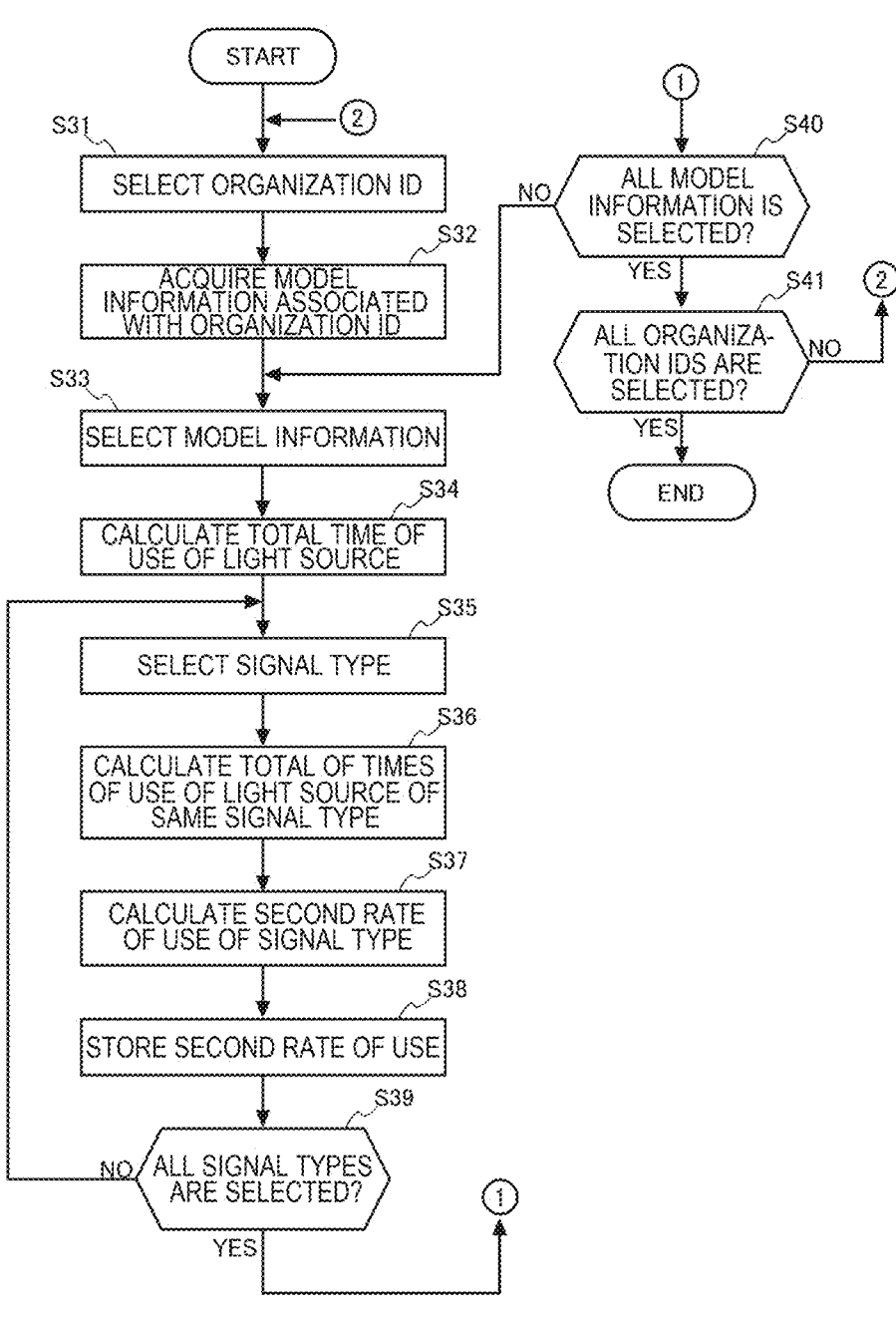
FIG. 8 is a flowchart showing a first example of operation of the information processing device.

FIG. 8 is a flowchart illustrating a first example of operation of the information processing device. Specifically, FIG. 8 is a flowchart illustrating an operation when the information processing device 200 calculates the total time of use and the second rate of use.

The second control unit 230 selects an organization ID (step S31). Next, the second control unit 230 refers to the user management DB 252 and acquires the model information 123 associated with the selected organization ID (step S32).

Next, the second control unit 230 calculates the total time of use of the light source (step S33). The second control unit 230 acquires the time of use of the device light source of the projector 100 of the model of the model information 123 acquired in step S32, and calculates the total time of the acquired time of use of the device light sources as the total time of use of the light source (step S34).

Next, the second control unit 230 selects one signal type of the input signal input to the projector 100 corresponding to the model information 123 acquired in step S32 (step S35). The second control unit 230 acquires the times of use of the light source of the selected signal type from the projectors 100 of the same model, and calculates the total of the times of use of the light source of the acquired signal type (step S36).

Next, the second control unit 230 calculates the second rate of use, based on the total time of use of the light source calculated in step S34 and the total of the times of use of the light source of the signal type calculated in step S36 (step S37). The second control unit 230 divides the total of the times of use of the light source of the signal type by the total time of use of the light source and thus calculates the second rate of use.

Next, the second control unit 230 stores the calculated second rate of use in the second storage unit 250 in association with the signal type (step S38).

Next, the second control unit 230 determines whether all the signal types are selected (step S39). When not all the signal types are selected (NO in step S39), the second control unit 230 returns to step S35 and selects a signal type.

When all the signal types are selected (step YES in S39), the second control unit 230 determines whether all the model information 123 is selected (step S40). When not all the model information 123 is selected (NO in step S40), the second control unit 230 returns to step S33 and selects model information 123.

When all the model information 123 is selected (YES in step S40), the second control unit 230 determines whether all the organization IDs are selected (step S41). When not all the organization IDs are selected (NO in step S41), the second control unit 230 returns to step S31 and selects an organization ID. Upon selecting all the organization IDs, the second control unit 230 ends this processing flow.

4. Second Embodiment

A second embodiment will now be described.

The system configuration in the second embodiment is the same as that in the first embodiment shown in FIG. 1, and the configurations of the projector 100, the information processing device 200, and the terminal device 30 are also the same as those in the first embodiment.

In the second embodiment, the number of times of input of the input signal is counted for each signal type of the input signal, and the first rate of use and the second rate of use are calculated, based on the counted number of times of input.

FIG. 9 is a diagram illustrating an example of the configuration of a second status-of-use management DB 254 stored in the second storage unit 250. The information processing device 200 according to the second embodiment stores the second status-of-use management DB 254 illustrated in FIG. 9 in the second storage unit 250 instead of the first status-of-use management DB 253 illustrated in FIG. 5.

The second status-of-use management DB 254 is a database in which the number of times of device input, the signal type, the number of times of input of the signal type, and the first rate of use are registered in association with the projector ID 122.

The number of times of device input is the number of times the input signal serving as the source of the image to be projected is input to the projector 100 of the projector ID 122, and is the total number of times of input for each signal type. In the second embodiment, a case where the number of times the input signal is input to the projector 100 is calculated as the number of times of device input is described, but the number of times of device input may be the average value of the number of times of input of the input signal input in a preset period.

The signal type is information indicating the signal type of the input signal input to the projector 100 of the projector ID 122.

The number of times of input of the signal type is information indicating the number of times the input signal of the signal type is input. The number of times of input may be counted as one when the input signal is continuously input to the interface indicated by the type information for a preset threshold time or longer.

Also, in the present embodiment, a case where the number of times of input for each signal type is calculated is described, but the average number of times for each type of input signal input in a preset period may be calculated.

The first rate of use is information indicating the rate at which the input signal of the signal type is used for projecting an image in the projector 100. The first rate of use is obtained by dividing the number of times of input of the signal type by the number of times of device input.

When the input of the input signal to the projector 100 is detected and it is determined that this input signal is the input signal serving as the source of the image to be projected, the information acquisition unit 132 of the projector 100 determines whether this input signal is continuously input for the threshold time or longer.

When the information acquisition unit 132 determines that the input signal is continuously input for the threshold time or longer, the information transmission unit 133 transmits the light source use information to the information processing device 200. The light source use information transmitted in this case includes the signal type of the input signal, the projector ID 122, and the model information 123.

The acquisition unit 241 of the information processing device 200 acquires the light source use information transmitted from the projector 100.

The processing unit 242 updates the second status-of-use management DB 254, based on the light source use information acquired by the acquisition unit 241.

The processing unit 242 detects a record in the second status-of-use management DB 254, based on the projector ID 122 included in the light source use information, and adds 1 to the number of times of device input and the number of times of input of the corresponding signal type.

The processing unit 242 calculates the first rate of use. The processing unit 242 divides the number of times of input of the corresponding signal type by the number of times of device input and thus calculates the first rate of use.

The processing unit 242 also calculates the second rate of use.

The processing unit 242 acquires the organization ID of the processing target and acquires the model information 123 associated with the acquired organization ID. Next, the processing unit 242 calculates the total of the number of times of device input as the total number of times of input for each projector 100 having the same model information 123. The total number of times of input may be the average value of the numbers of times of input of the input signal input within a preset period.

Next, the processing unit 242 calculates the total of the number of times of input of the same signal type of the projectors 100 having the same model information 123. The total number of times of input of the signal type may be the average value of the numbers of times of input of the signal type in a preset period. The processing unit 242 divides the calculated total of the number of times of input of the signal type by the total number of times of input and thus calculates the second rate of use.

Figure 10:
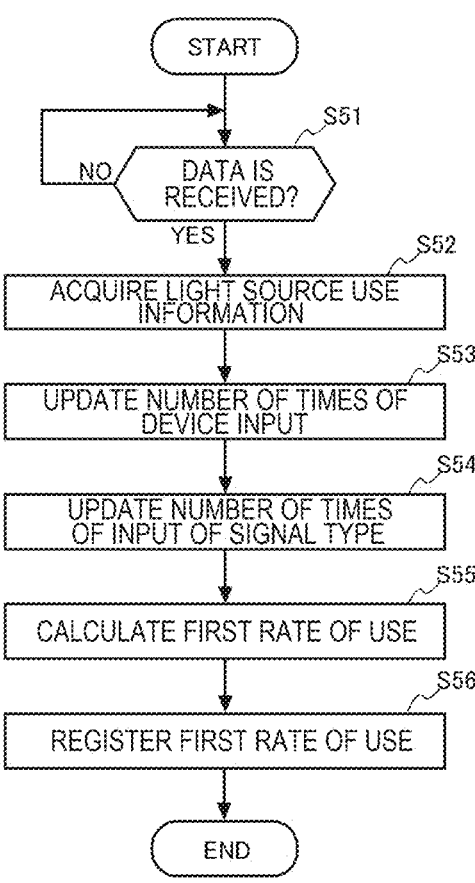
FIG. 10 is a flowchart showing a second example of operation of the information processing device.

FIG. 10 is a flowchart illustrating a second example of operation of the information processing device. Specifically, FIG. 10 is a flowchart illustrating an operation when the information processing device 200 calculates the number of times of device input and the first rate of use.

First, the second control unit 230 determines whether data is received via the network NW (step S51). When data is not received (NO in step S51), the second control unit 230 waits until data is received.

Upon receiving data (YES in step S51), the second control unit 230 acquires the light source use information included in the received data (step S52).

Next, the second control unit 230 acquires the projector ID 122 included in the acquired light source use information, searches the first status-of-use management DB 253, based on the acquired projector ID 122, and detects the record of the projector ID 122. The second control unit 230 adds 1 to the number of times of device input of the corresponding projector ID 122 and thus updates the number of times of device input (step S53).

Next, the second control unit 230 acquires the signal type included in the light source use information, adds 1 to the number of times of input of the signal type corresponding to the acquired signal type, and thus updates the number of times of input (step S54).

Next, the second control unit 230 divides the updated number of times of input of the signal type by the number of times of device input and thus calculates the first rate of use (step S55). The second control unit 230 rewrites and updates the first rate of use of the signal type with the calculated first rate of use (step S56).

Figure 11:
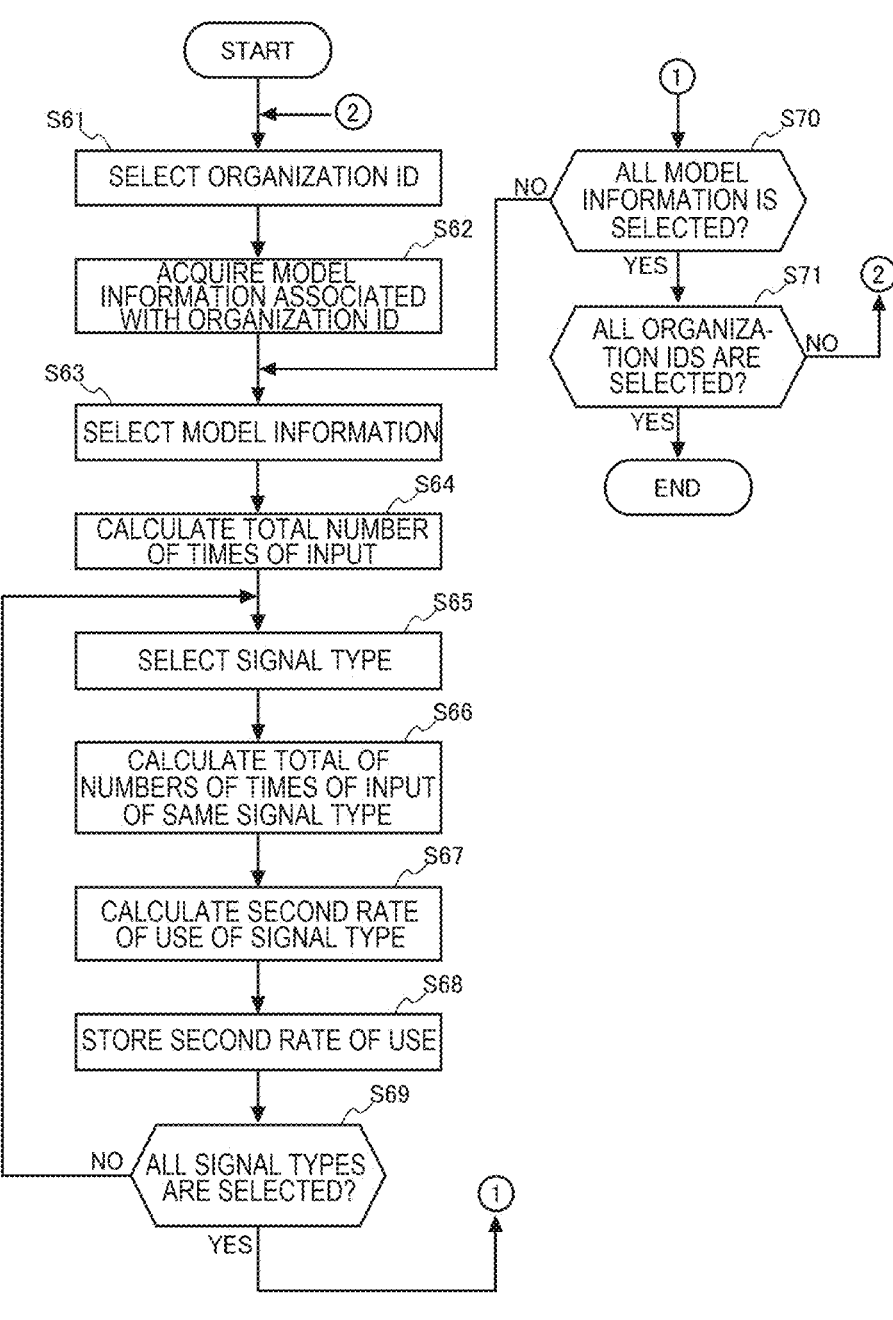
FIG. 11 is a flowchart showing a second example of operation of the information processing device.

FIG. 11 is a flowchart illustrating a second example of operation of the information processing device. Specifically, FIG. 11 is a flowchart illustrating an operation when the information processing device 200 calculates the total number of times of input and the second rate of use.

In the flowchart shown in FIG. 11, step S64 is different from step S34 in the flowchart shown in FIG. 8, and step S66 is different from step S36 in the flowchart shown in FIG. 8. Therefore, step S64 and step S66 will be described.

When the model information 123 is selected (step S63), the second control unit 230 acquires the number of times of device input of the projector 100 of the model of the selected model information 123, and calculates the total of the acquired number of times of device input as the total number of inputs (step S64).

Next, the second control unit 230 selects the signal type of the input signal input to the projector 100 of the model of the model information 123 acquired in step S63 (step S65). The second control unit 230 acquires the number of times of type input of the selected signal type and calculates the total of the acquired number of times of type input (step S66).

Next, the second control unit 230 calculates the second rate of use, based on the total number of times of input calculated in step S64 and the total of the number of times of type input calculated in step S66 (step S67). The second control unit 230 divides the total of the number of times of type input by the total number of times of input and thus calculates the second rate of use.

Since the operation of the second control unit 230 after this processing is the same as in the first embodiment illustrated in FIG. 8, the detailed description thereof is omitted.

5. Summary of Present Disclosure

The present disclosure will be summarized below in the form of appendices.

Appendix 1

A display device management method includes: causing a display device to acquire type information indicating a type of an input signal input to the display device; causing the display device to transmit device identification information for identifying the display device and the type information to an information processing device; causing the information processing device to store the device identification information and the type information in a storage unit in association with each other; causing the information processing device to calculate information indicating a status of use of the input signal of each type indicated by the type information for each of the device identification information; causing the information processing device to acquire, from the storage unit, organization identification information associated with the device identification information, the organization identification information being identification information of an organization to which a user using the display device of the device identification information or the display device belongs; and outputting the organization identification information and the information indicating the status of use of the input signal.

Thus, the organization identification information and the information indicating the status of use for each type of the input signal input to the display device used by the user or the organization of the organization identification information are output. Therefore, the status of use for each type of the input signal can be acquired efficiently.

Appendix 2

In the display device management method according to Appendix 1, the acquiring the type information indicating the type of the input signal includes acquiring information indicating an input status of the input signal, the transmitting includes transmitting the device identification information, the type information, and the information indicating the input status to the information processing device, the calculating includes calculating a total time during which the input signal is input to the display device or an average time during which the input signal is input to the display device in a preset period for each type of the input signal indicated by the type information, based on the information indicating the input status as the information indicating the status of use of the input signal, and the outputting includes outputting the total time or the average time as the information indicating the status of use of the input signal.

Thus, the total time during which the input signal is input to the display device, or the average time during which the input signal is input to the display device in the preset period can be acquired for each type of input signal. Therefore, the status of use for each type of input signal can be easily grasped.

Appendix 3

In the display device management method according to Appendix 1, the calculating includes calculating a total number of times the input signal is input to the display device or an average value of the number of times the input signal is input to the display device in a preset period as the information indicating a status of use of the input signal for each type of the input signal indicated by the type information, and the outputting includes outputting the total number of times or the average value of the number of times the input signal is input as the information indicating the status of use of the input signal.

Thus, the total number of times the input signal is input to the display device, or the average value of the number of times the input signal is input to the display device in the preset period can be acquired for each type of the input signal. Therefore, the status of use for each type of input signal can be easily grasped.

Appendix 4

In the display device management method according to Appendix 2, the storage unit stores the organization identification information, the device identification information, and model information indicating a model of the display device corresponding to the device identification information in association with each other, and the calculating includes calculating the total time or the average time calculated for each type of the input signal for each display device associated with the same organization identification information and having the same model indicated by the model information.

Thus, the total time during which the input signal is input to the display device, or the average time during which the input signal is input to the display device in the preset period, and the total time or the average time for each type of the input signal can be acquired for each display device of the same model. Therefore, the status of use for each type of input signal can be easily grasped for each display device of the same model.

Appendix 5

In the display device management method according to Appendix 3, the storage unit stores the organization identification information, the device identification information, and model information indicating a model of the display device corresponding to the device identification information in association with each other, and the calculating includes calculating the total number of times calculated for each type of the input signal or an average value of the number of times the input signal is input to the display device for each display device associated with the same organization identification information and having the same model indicated by the model information.

Thus, the total number of times the input signal is input to the display device or the average value of the number of times the input signal is input to the display device in the preset period that is the total number of times or the average value of the number of times for each type of the input signal can be grasped for each display device of the same model. Therefore, for each display device of the same model, the rate of use for each type of input signal can be grasped and information about the status of use of the input signal in the display device can be acquired efficiently.

Appendix 6

In the display device management method according to one of Appendices 1 to 3, the device identification information for identifying the display device includes a serial number assigned to the display device or model information indicating a model of the display device.

Thus, the display device can be identified by the serial number, which is the device identification information, or by the model information.

Appendix 7

A management system includes a display device and an information processing device, the display device including: a first communication unit; an interface; and a first control unit that acquires type information indicating a type of an input signal input to the interface and causes the first communication unit to transmit the acquired type information and device: information for identifying the display device to the information processing device, the information processing device including: a second communication unit; and a second control unit that stores the device identification information and the type information received by the second communication unit in a storage unit in association with each other, calculates information indicating a status of use of the input signal of each type indicated by the type information for each of the device identification information, acquires, from the storage unit, organization identification information associated with the device identification information, the organization identification information being identification information of an organization to which a user using the display device of the device identification information or the display device belongs, and outputs the organization identification information and the information indicating the status of use of the input signal.

Thus, the organization identification information and the information indicating the status of use for each type of the input signal input to the display device used by the user or the organization of the organization identification information are output. Therefore, the status of use for each type of the input signal can be acquired efficiently.

6. Other Embodiments

The above embodiments are preferred embodiments of the present disclosure. However, the present disclosure is not limited to these embodiments, and various modifications can be made without departing from the spirit and scope of the present disclosure.

In the above embodiments, the case where the organization ID is set and where the projector 100 is managed organization is described, but the projector 100 may be managed, based on groups freely set by the user. In this case, a group ID may be provided in addition to the organization ID, and the projector ID may be registered for each group ID.

Also, a plurality of organizations may be set as partners, and the projector 100 may be managed for each partner. The partners include, for example, prefectures, cities, towns, and villages.

In each of the above embodiments, the management system 1 employing the projector 100 as an example of the display device is described, but the display device to which the present disclosure is applied is not limited to the projector 100. For example, the display device may be a liquid crystal display that displays an image on a liquid crystal display panel. The display device may also be a display device that displays an image on a plasma display panel or an organic EL (electro-luminescence) panel. In this case, the liquid crystal display panel, the plasma display panel, and the organic EL panel is equivalent to an example of a display unit.

The configurations of the first control unit 110 and the second control unit 230 are not limited, and may be implemented by a plurality of processors or a plurality of semiconductor devices.

The functional units of the projector 100 illustrated in FIG. 2 represent functional configurations and are not particularly limited to any specific implementation form. Similarly, the functional units of the information processing device 200 illustrated in FIG. 3 represent functional configurations and are not particularly limited to any specific implementation form. Specifically, hardware individually corresponding to the functional units illustrated in the foregoing drawings need not necessarily be implemented, and one processor may execute a program to implement functions of a plurality of functional units. In the above-described embodiments, a part of functions implemented by software may be implemented by hardware, or a part of functions implemented by hardware may be implemented by software.

The processing elements in the flowcharts shown in FIGS. 7, 8, 10, and 11 are provided by dividing the processing according to the main processing contents in order to facilitate the understanding of the processing performed by the second control unit 230. The present disclosure is not limited by the way the processing is divided into the processing elements and the names of the processing elements illustrated in the flowcharts. The processing may be divided into more processing elements according to the processing contents, or may be divided so that one processing element includes more processing. Also, the order of the processing in the foregoing flowchart is not limited to the illustrated example. The same applies to the processing elements in the flowchart shown in FIG. 6.

The control program 121 executed by the first control unit 110 and the control program 251 executed by the second control unit 230 may be recorded, for example, in a recording medium in which the programs are recorded to be readable by the projector 100 or the information processing device 200. As the recording medium, a magnetic or optical recording medium or a semiconductor memory device can be used. Specifically, a portable recording medium such as a flexible disc, a compact disc read-only memory (CD-ROM), a digital versatile disk (DVD), a Blu-ray (trademark registered) disc, a magneto-optical disc, a flash memory, or a card-type recording medium, or a stationary recording medium may be used. Also, these programs may be stored in a server device or the like, and the control program may be downloaded from the server device, thus implementing the above control method.

What is claimed is:

1. A display device management method comprising:
    causing a display device to acquire type information indicating a type of an input signal input to the display device;
    causing the display device to acquire information relating to usage time or usage count of the input signal input to the display device;
    causing the display device to transmit device identification information for identifying the display device and the type information to an information processing device;
    causing the information processing device to store the device identification information and the type information in a storage unit in association with each other;
    causing the information processing device to calculate information indicating a status of use of the input signal of each type indicated by the type information for each of the device identification information;
    causing the information processing device to acquire, from the storage unit, organization identification information associated with the device identification information, the organization identification information being identification information of an organization to which a user using the display device of the device identification information or the display device belongs; and
    outputting the organization identification information and the information indicating the status of use of the input signal,
    wherein the information indicating the status of use of the input signal is calculated based on the information relating to usage time or usage count of the input signal, and
    the information indicating the status of use of the input signal includes at least one of information relating to time, information relating to count, or information relating to ratio.

2. The display device management method according to claim 1, wherein the acquiring the information relating to usage time or usage count of the input signal includes acquiring information indicating an input status of the input signal, the transmitting includes transmitting the device identification information, the type information, and the information indicating the input status to the information processing device, the calculating includes calculating a total time during which the input signal is input to the display device or an average time during which the input signal is input to the display device in a preset period for each type of the input signal indicated by the type information, based on the information indicating the input status as the information indicating the status of use of the input signal, and the outputting includes outputting the total time or the average time as the information indicating the status of use of the input signal.

3. The display device management method according to claim 2, wherein the storage unit stores the organization identification information, the device identification information, and model information indicating a model of the display device corresponding to the device identification information in association with each other, and the calculating includes calculating the total time or the average time calculated for each type of the input signal for each display device associated with the same organization identification information and having the same model indicated by the model information.

4. The display device management method according to claim 1, wherein the calculating includes calculating a total number of times the input signal is input to the display device or an average value of the number of times the input signal is input to the display device in a preset period as the information indicating a status of use of the input signal for each type of the input signal indicated by the type information and the information relating to usage time or usage count of the input signal, and the outputting includes outputting the total number of times or the average value of the number of times the input signal is input as the information indicating the status of use of the input signal.

5. The display device management method according to claim 4, wherein the storage unit stores the organization identification information, the device identification information, and model information indicating a model of the display device corresponding to the device identification information in association with each other, and the calculating includes calculating the total number of times calculated for each type of the input signal or an average value of the number of times the input signal is input to the display device for each display device associated with the same organization identification information and having the same model indicated by the model information.

6. The display device management method according to claim 1, wherein the device identification information for identifying the display device includes a serial number assigned to the display device or model information indicating a model of the display device.

7. A management system comprising a display device and an information processing device, the display device comprising:

a first communication unit;

an interface; and a first control unit that acquires type information indicating a type of an input signal input to the interface and information relating to usage time or usage count of the input signal input to the interface, and causes the first communication unit to transmit the acquired type information, the acquired information relating to usage time or usage count of the input signal, and device identification information for identifying the display device to the information processing device, the information processing device comprising:

a second communication unit; and a second control unit that stores the device identification information and the type information received by the second communication unit in a storage unit in association with each other, calculates information indicating a status of use of the input signal of each type indicated by the type information and the information relating to usage time or usage count of the input signal for each of the device identification information, acquires, from the storage unit, organization identification information associated with the device identification information, the organization identification information being identification information of an organization to which a user using the display device of the device identification information or the display device belongs, and outputs the organization identification information and the information indicating the status of use of the input signal.

8. The management system according to claim 7, wherein the calculating includes calculating a total number of times the input signal is input to the display device or an average value of the number of times the input signal is input to the display device in a preset period as the information indicating a status of use of the input signal for each type of the input signal indicated by the type information, and the outputting includes outputting the total number of times or the average value of the number of times the input signal is input as the information indicating the status of use of the input signal.

9. The management system according to claim 8, wherein the storage unit stores the organization identification information, the device identification information, and model information indicating a model of the display device corresponding to the device identification information in association with each other, and the calculating includes calculating the total number of times calculated for each type of the input signal or an average value of the number of times the input signal is input to the display device for each display device associated with the same organization identification information and having the same model indicated by the model information.

10. The management system according to claim 7, wherein the storage unit stores the organization identification information, the device identification information, and model information indicating a model of the display device corresponding to the device identification information in association with each other, and the calculating includes calculating a total time or an average time calculated for each type of the input signal for each display device associated with the same organization identification information and having the same model indicated by the model information.

11. The management system according to claim 7, wherein the device identification information for identifying the display device includes a serial number assigned to the display device or model information indicating a model of the display device.

* * * * *